APPARATUS FOR DISPLAYING CHARACTERS AS A SEQUENCE OF LINEAR VISIBLE TRACES

Filed Feb. 21, 1961 6 Sheets-Sheet 1

DISPLAY SYSTEM BLOCK

INVENTORS
PAUL R. LOW
EDWARD J. SKIKO
DONALD F. CHARGOIS
BY Roy C. Hopgood
ATTORNEY United States Patent Office 3,248,725
Patented Apr. 26, 1966

3,248,725

APPARATUS FOR DISPLAYING CHARACTERS AS A SEQUENCE OF LINEAR VISIBLE TRACES

Paul R. Low, Palo Alto, Calif., and Edward J. Skiko, Poughkeepsie, and Donald F. Chargois, Wappingers Falls, N.Y., assignors to International Business Machines Corporation, New York, N.Y., a corporation of New York Filed Feb. 21, 1961, Ser. No. 90,678
9 Claims. (Cl. 340—324)

This invention relates to display systems and techniques, and more particularly to apparatus and methods for converting information to visible form.

Despite the fact that, for high speed modern techniques such as data processing, it is expedient to handle information in the form of electrical signals, it is sometimes desirable and even necessary to display such information in visual form.

To this end, there have been conceived different systems for visually displaying alphanumeric data and the like to accommodate the relatively slow perception of human operators. It is in this field that the invention finds its principal application and it is an object of the invention to provide improved apparatus and methods relating to the visible display of information which is otherwise available in the form of electrical signals or in some form of code.

One previously conceived technique useful in the field with which the invention is concerned involves the use of a cathode ray tube which is scanned with a conventional television scan and which is provided with selective blanking circuits in order to form the desired characters. While this technique is capable of displaying all characters within the limits of its resolution, it is not well suited for modern techniques by reasons of the relatively large number of circuits required to selectively blank the scanning beam which traverses the entire screen.

Also known in the field with which the invention is concerned is a universal pattern scan technique wherein an electronic beam is moved through all of the positions of a particular code. In this technique a selective blanking of the beam provides the specific character display desired. This technique is, however, also subject to the objection that a large number of control circuits are required.

With reference to the known techniques discussed above, it is an object of the invention to avoid the deficiencies inherent therein and to provide improved methods and arrangements which minimize the size and number of control circuits which must be employed.

Still another technique which has found application in analog equipment is that of producing Lissajous approximations of wave forms necessary to produce and display desired characters. This technique is well suited to devices wherein an analog input is available, but is not susceptible of use in digital equipment.

In this regard, it is an object of the invention to provide improved methods and arrangements whereby information available in digital codes can repeatedly and efficiently be displayed in a form readily understood by human operators.

A further object of the invention is to provide a display device which provides for the time-sharing of various components.

Still another object of the invention is to provide for the positioning of a character at any desired place in a display zone.

A further object of the invention is to provide a system which is readily adapted to customer requirements and which is thus readily modified to provide special symbols and characters, and so forth.

Briefly, the invention contemplates the displaying of characters such as are employed in indicating alphanumeric information, symbols, graphs and the like, by representing each character in the form of straight-line segments approximating the shapes of the characters. A character may, for example, be formed of a series of interconnected straight-line segments which, in turn, can, in accordance with the invention, be formed in response to straight-line voltage functions or variable slope voltage ramps.

According to the invention, a coded signal representing a character of information in, for example, a data processor can be employed to trigger a sequence of signals which, in turn, control the displaying of a sequence of straight lines or straight-line segments which approximate this character.

A further feature of the invention is to be found in the deflection system provided thereby and in the particular deflection voltages which are employed, as well as in the specific circuits relating thereto.

Still another feature of the invention relates to the provision of a system wherein a character can be repeatedly retraced with a timing independent of that of any associated data processor and, more particularly, at a rate adapted for preventing visible flicker.

Advantageously, it is possible in accordance with the invention to determine first the latitude which is permitted in approximating the characters of an information code and to minimize the circuitry necessary in accordance with the approximations permissible. This leads to extremely significant economical results and is a far more flexible technique than has heretofore been available.

Other objects, features and advantages of the invention will be found in the following detailed description of a preferred embodiment thereof, as illustrated in the accompanying drawing in which.

Figure 2:
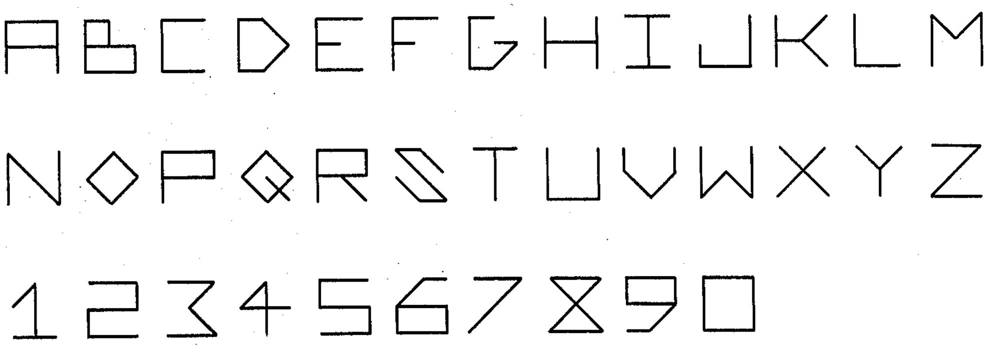
FIG. 2 illustrates alphanumeric characters approximated by straight-line segments in one particular form thereof.
Figure 4A:
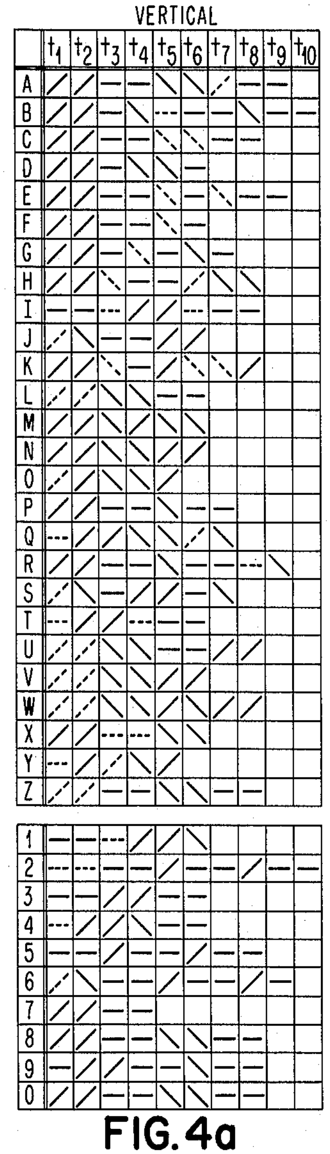
Figure 4B:
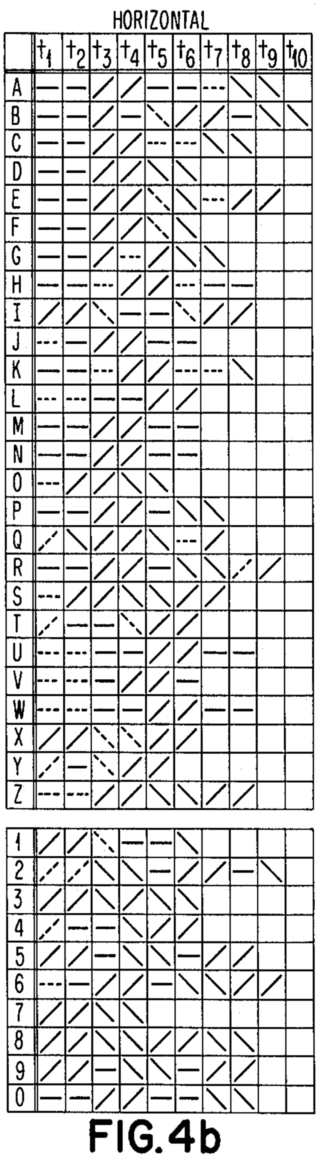
Figure 3:
FIG. 3 illustrates a second group of approximated letters and numbers.
Figure 5:
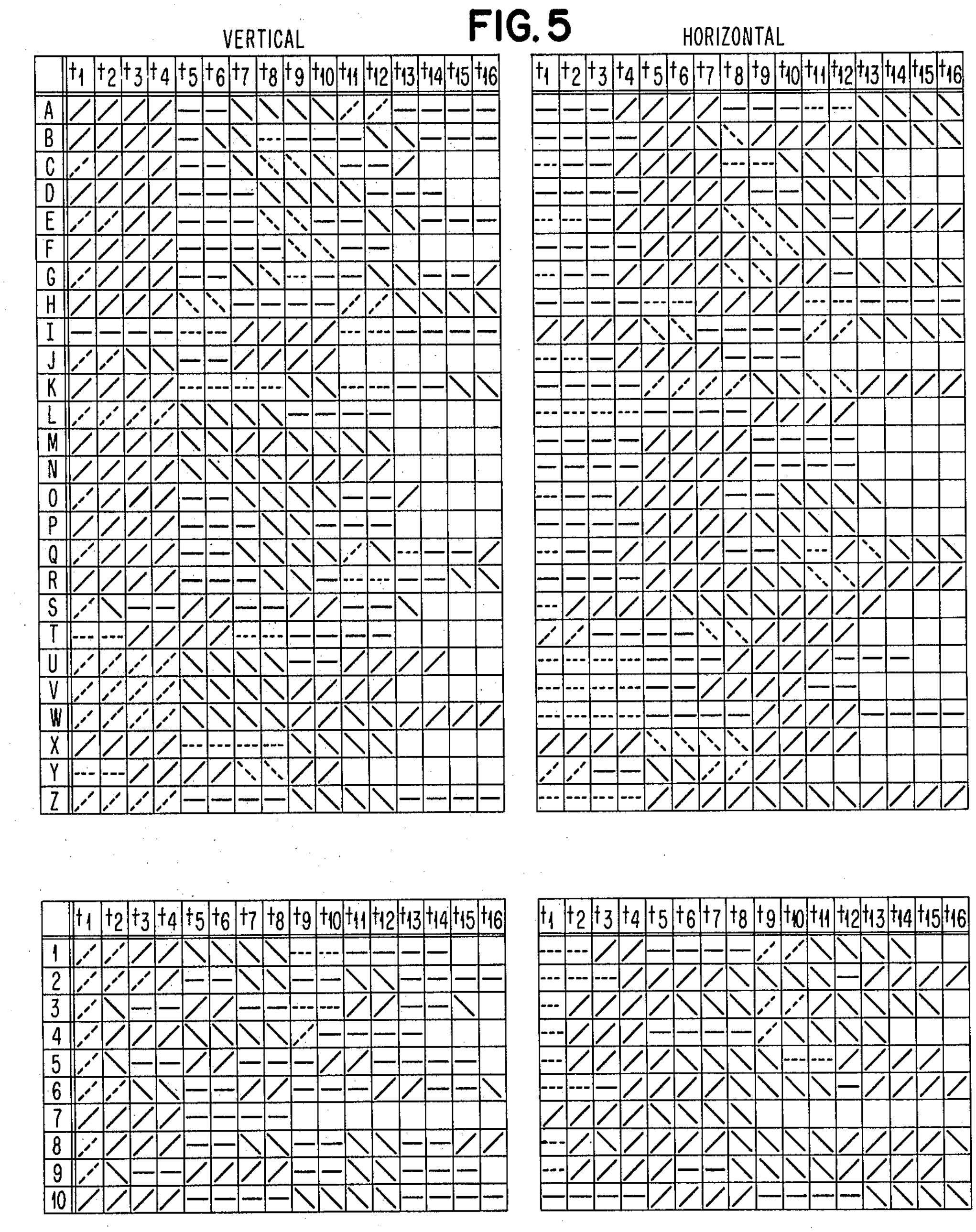
Figures 6A, 6B:
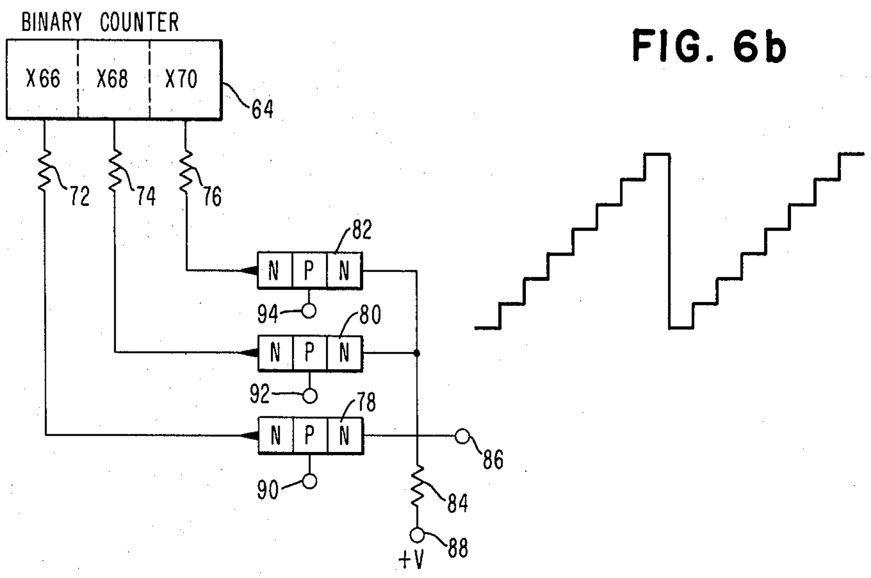
Figure 10A:
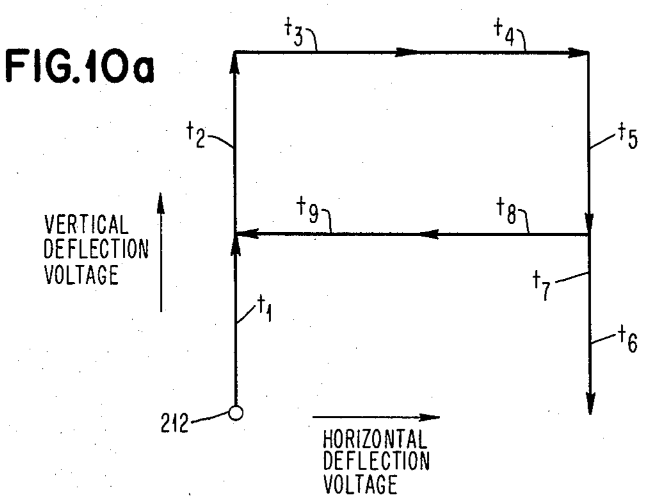
Figure 10B:
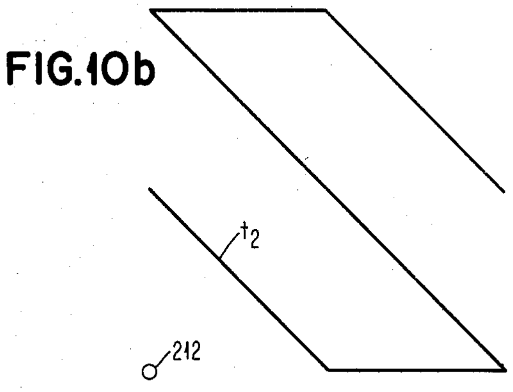
Figure 7:
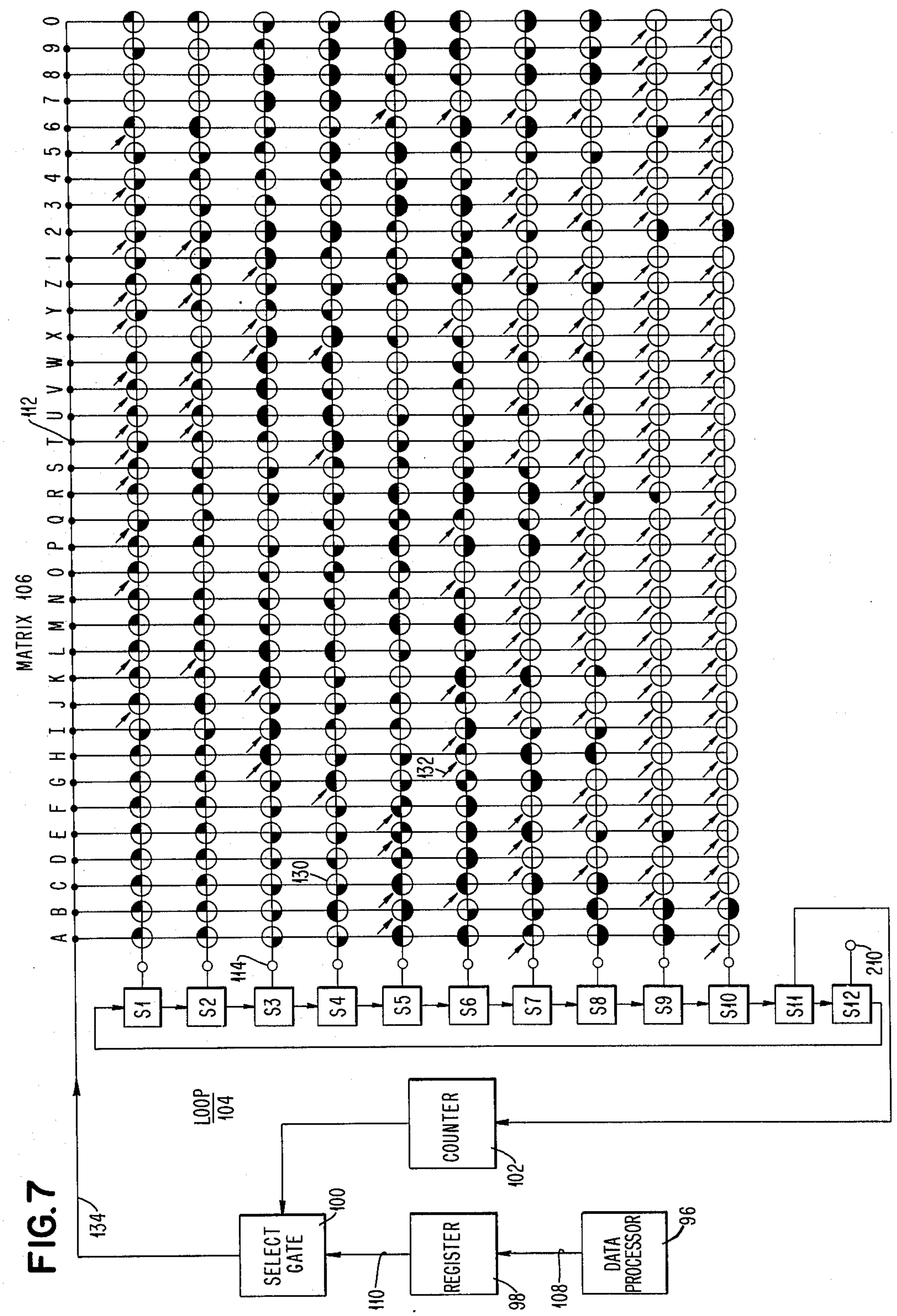
Figures 8, 9:
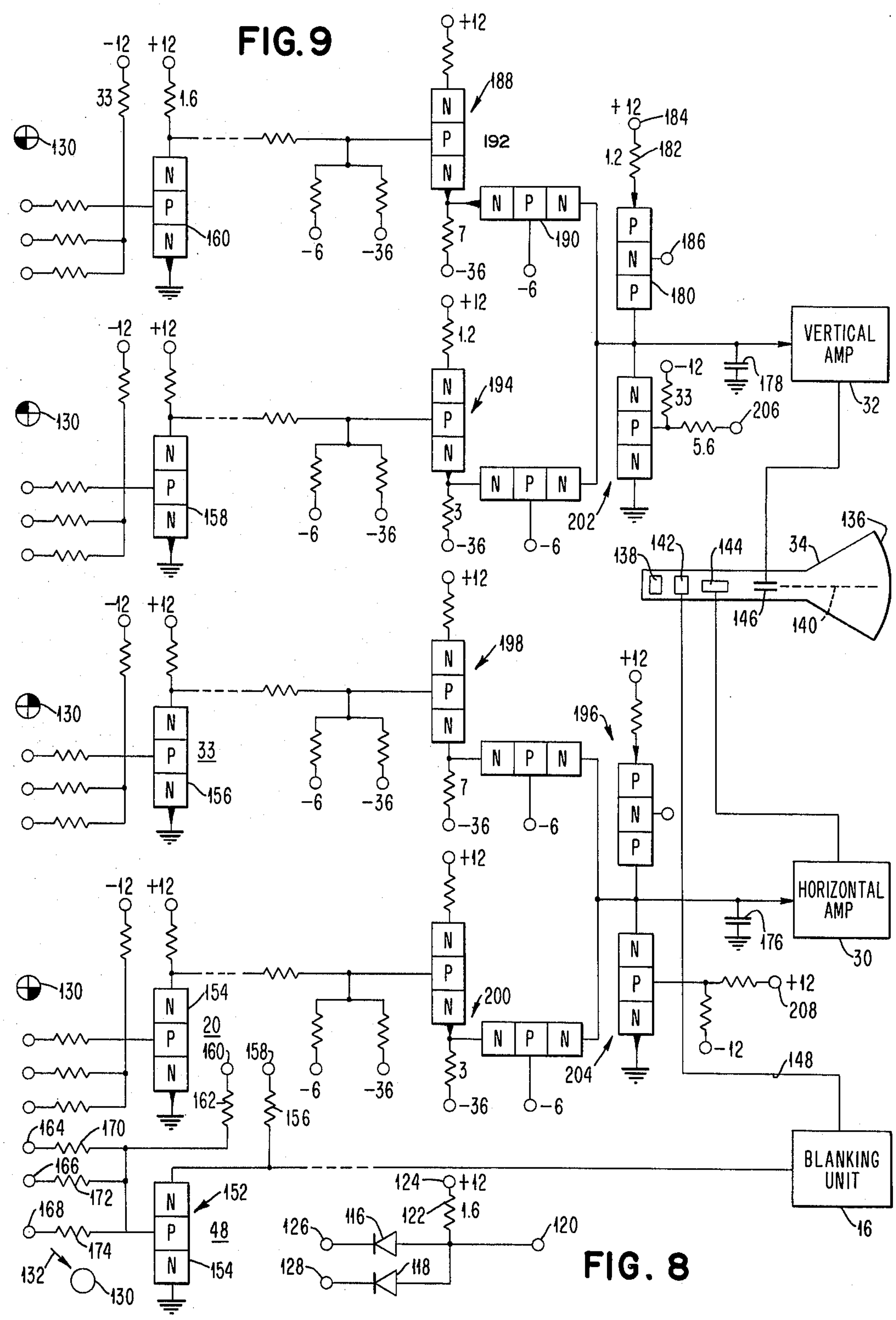

FIG. 4*a* illustrates the variable slope voltage ramps to be applied to a set of vertical deflector plates according to the code of FIG. 2;

FIG. 4*b* illustrates the variable slope voltage ramps to be applied to the horizontal deflector plates in order to display the characters of FIG. 2;

FIG. 5 illustrates the vertical and horizontal voltage functions necessary for the approximations of FIG. 3;

FIG. 6*a* illustrates a circuit for loacting the characters in a display zone;

FIG. 6*b* illustrates the wave form produced by the circuit of FIG. 6*a*;

FIG. 7 illustrates, in block form, a source of characters and, in schematic form, a circuit which supplies for each character a sequence of signals which control the forming of a character approximation;

FIG. 8 illustrates a detail of FIG. 7;

FIG. 9 is a partially schematic and partially block diagram of the deflector control means and display member of the invention; and FIGS. 10*a* and 10*b* diagrammatically illustrate the formation and approximation of characters according to the aforegoing arrangements and approximations.

According to the invention, a method is provided for displaying characters of information which are otherwise available, for example, as electrical signals. This method can be viewed as comprising the step of converting these signals into linear voltage functions and then converting these functions into visible straight lines which approximate the appearance of the characters of information.

Generally, the apparatus of the invention comprises means for representing information or characters of information as a plurality of signals and means responsive to these signals for generating in turn predetermined sequences of linear voltage functions or the like, there being further provided means for converting these voltage functions to visible straight lines representing the information. It will be understood in the text which follows that the term "characters" is used in its broadest sense to cover alphabet and numerical characters, as well as symbols, charts, graphs, various types of hieroglyphics, and the like.

Figure 1:
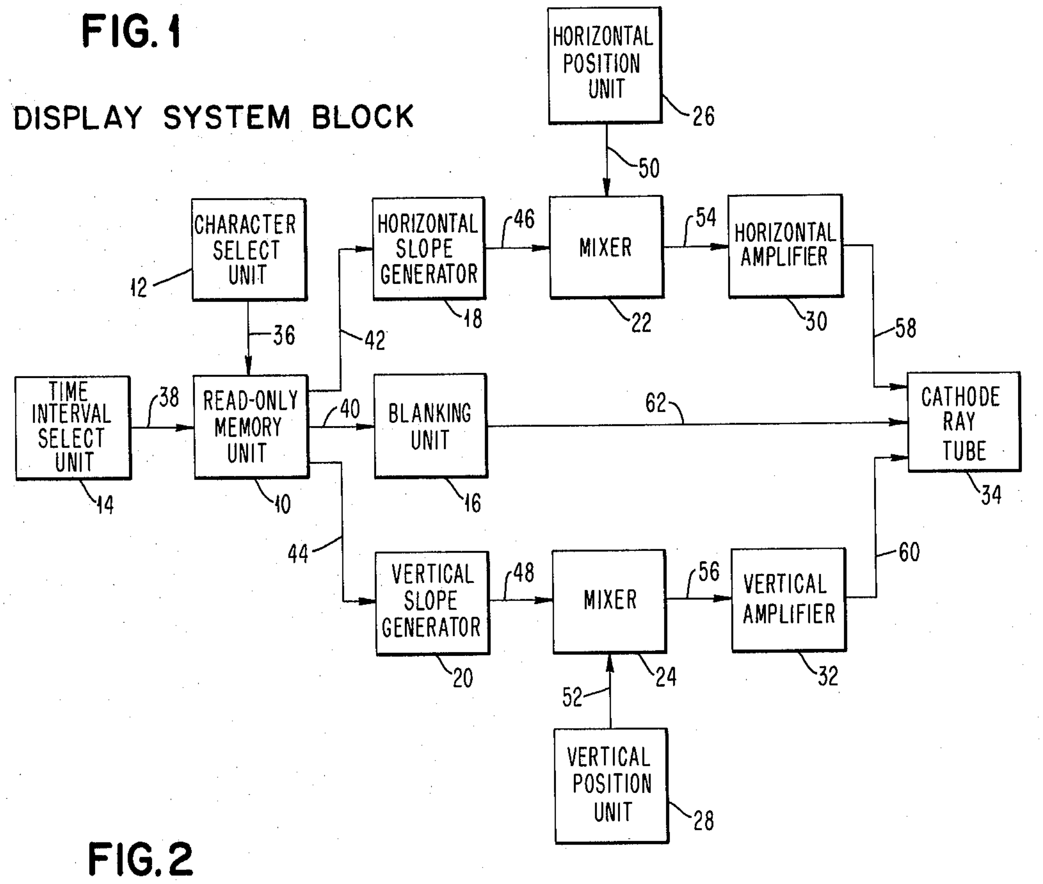
FIG. 1 is a block diagram of a display system provided in accordance with the invention.

FIG. 1 illustrates in block form a circuit constituting a preferred embodiment of the invention. This circuit comprises, by way of non-limitative example, a read-only memory unit 10, a character select unit 12, a time interval select unit 14, a blanking unit 16, a horizontal slope generator 18, a vertical slope generator 20, mixers 22 and 24, a horizontal position unit 26, a vertical position unit 28, a horizontal amplifier 30, a vertical amplifier 32, and a cathode ray tube 34.

The read-only memory unit 10 constitutes a source of predetermined sequences of linear voltage functions or variable slope voltage ramps, each sequence of which corresponds to a character in the system which intelligibly represents the information to be displayed. Stated otherwise, in the system of the invention each character is represented by a sequence of signals which is available for selection in the read-only memory unit 10.

To the unit 10 is connected the character select unit 12 by means of line 36. The character unit 12 functions to control the sequence which the unit 10 is to transmit to the deflection circuitry, as will be further indicated hereinafter. The character select unit 12 may include, or be connected to, a storage unit which receives, from an asociated system such as a data processor, information to be displayed.

Also connected to the unit 10 is the time-interval select unit 14 which transmits control signals to the unit 10 via the line 38. It is the function of unit 14 to sample the signals of a particular sequence in order to permit the same to be employed in time sequence for visibly approximating a character. The unit 14 also performs other supplemental functions which will be discussed hereinafter.

Connected to the unit 10 by means of line 40 is the blanking unit 16. This unit serves to blank out the tracing beam of cathode ray tube 34 during selected time periods such as, for example, when retracing a line segment, when tracing a segment that is not an integral portion of a character and when moving from one character to the next.

Horizontal slope generator 18 and vertical slope generator 20, which are discussed in substantially greater detail hereinafter, are connected to the unit 10 via lines 42 and 44. These generators respond to signals received from the unit 10 by producing the necessary deflection voltages which are applied to cathode ray tube 34 to form the approximations illustrated, for example, in FIGS. 2 and 3.

Mixers 22 and 24 are respectively coupled to generators 18 and 20 by lines 46 and 48. Mixers 22 and 24 are further respectively coupled to horizontal position unit 26 and vertical position unit 28 by lines 50 and 52. Mixers 22 and 24 function to adapt the signals received from the units to which they are connected for both locating and forming the character approximations.

Amplifiers 30 and 32 are respectively coupled to mixers 22 and 24 by means of lines 54 and 56 and are, in turn, coupled to the cathode ray tube 34 by means of lines 58 and 60. Also coupled to the cathode ray tube is the blanking unit 16 by means of line 62.

The cathode ray tube 34 constitutes a display device and is actually the display member of the display system of the invention. Its function is to emit visible light confined in intelligible form to specific locations which represents characters of information or approximations thereof.

The particular connection of the components of tube 34 will be discussed in greater detail hereinafter.

FIG. 2 illustrates a complete alphabet and all of the digits of the decimal system approximated according to the preferred technique of the invention. The voltages for tracing these approximations on the screen of cathode ray tube 34 are seen in FIGS. 4*a* and 4*b*. In these latter figures, each character has in correspondence therewith a sequence of vertical deflection voltages and a sequence of horizontal deflection voltages. These voltages are assigned a time period designated sequentially as $t_1$, $t_2$ . . . $t_{10}$ and an inspection of FIGS. 4*a* and 4*b* reveals that the characters requiring the greatest number of sequential functions require ten such functions and therefore can be represented in ten time periods. These characters are, more particularly, the characters B and 2.

As will be shown hereinafter, these deflection voltages when applied to the vertical and horizontal deflection plates of cathode ray tube 34 form the approximations illustrated in FIG. 2. It is sufficient to note at this point that the voltages indicated by the lines sloping upwardly to the right indicate linearly increasing voltages; the horizontal lines indicate the maintaining constant of the deflection voltages and the lines sloping downwardly to the right indicate linearly decreasing voltages. It is significant to note that all of the characters in the system can be represented by voltages having three degrees of slope; to wit: 0° slope or ±45°.

FIG. 5 illustrates the sequence of voltage functions necessary to display the approximations of FIG. 3 wherein are characters which more nearly approximate the conventionally accepted form.

The characters of FIG. 3, however, require sixteen sequential time periods to provide for the characters in this code which require the maximum number of line segments and, as will become apparent, this system requires a larger number of circuit components for purposes of display than does the code of FIG. 2.

In addition to the formulation of each character approximation, it will be appreciated that a number of characters may desirably be displayed simultaneously in a display zone. Thus, for example, there may be desired a horizontal row of characters or, in fact, a plurality of horizontal rows which are vertically spaced. The invention thus makes provision for appropriately positioning the character approximations in a display zone. For this purpose, as has been noted above, there are provided the horizontal position unit 26 and the vertical position unit 28, the details of which are shown, by way of example, in FIG. 6*a*.

In FIG. 6*a* are illustrated a binary counter 64, including sections 66, 68 and 70, resistors 72, 74 and 76, transistors 78, 80 and 82, and a further resistor 84.

Transistor 78 is coupled on the one hand via resistor 72 to section 66 and, on the other hand, to an output terminal 86 and via resistor 84 to a terminal 88 connected to a positive source of voltage. Transistor 80 is also connected to output terminal 86 and is further connected via resistor 74 to section 68. Transistor 82 is connected to output terminal 86 and via resistor 84 to terminal 88 and is further connected via resistor 76 to section 70. Transistors 78, 80 and 82 are also connected to biasing terminals 90, 92 and 94.

In binary counter 64, sections 66, 68 and 70 are respectively the 1, 2, 4 stages of the counter. Resistor 72 is provided with an appropriate magnitude R of resistance with resistor 74 having a resistance with a magnitude of $R/2$ and resistor 76 having a resistance with a magnitude of $R/4$.

It will be appreciated that depending on which of the stages are activated and due to the values assigned to resistors 72, 74 and 76, step-function voltage will appear at output terminal 86 due to the voltage drop across resistor 84. This step voltage appears in FIG. 6*b* wherein the maximum voltage appearing is that existing at terminal 86 when there is no current flowing through resistor 84, the minimum voltage appearing at terminal 86 when all of the stages of binary counter 64 are drawing current so that there is a maximum current flow through resistor 84 and therefore a maximum voltage drop.

It is to be noted that this circuit is exemplary only and that other circuits adapted for providing discrete steps on the deflection plates of the associated cathode ray tube may also be employed. It will also be noted by reference to FIG. 1 that the voltage form illustrated in FIG. 6*b* is applied to mixer 22 to provide for horizontal stepping, whereas this voltage form is applied to mixer 24 to provide for vertical stepping.

With the origin positions determined for the character approximations as noted above, it remains necessary to provide for tracing the line segments and this, in turn, requires providing sequences of signals for controlling the display of sequences of line segments. This latter function is provided for by the apparatus schematically indicated in FIG. 7, wherein are illustrated a data processor 96, a register 98, a select gate 100, a counter 102 of the binary type, a recirculation loop 104, and a matrix 106.

The data processor 96 may be any conventional type of data processor in which information is available in the form of coded electrical signals. The data processor feeds the information to be displayed into a register 98 via a line 108. This information is stored in the register 98 and is taken therefrom as desired and independently of the rate of operation of the data processor 96. This permits the display operation to be effected independently of the rate of operation of the data processor 96 so that the computing rate thereof can proceed without interference. The register 98 can be any known type of storage device, such as a recirculation loop or a magnetic tape and may readily be provided by those skilled in the art.

Information in the register is transmitted therefrom via line 110 under the control of the select gate 100 which functions to distribute a character to the matrix 106 when necessary or desirable to the operation of the display system. It is to be observed generally, however, that the matrix 106 is provided with a plurality of input terminals 112 which are assigned to respective characters of the code with which the information is expressed. In FIG. 7 the characters are the alphanumeric characters of, for example, FIG. 2.

Matrix 106 is also provided with a further plurality of input terminals 114. These are, in turn, coupled to the sequencing components S1–S10, which may, in fact, be conventional delay lines or delay components providing a time sequencing for a pulse circulating in recirculation loop 104.

At the intersections of the vertical lines connected to terminals 112 and the horizontal lines connected to terminals 114 are positioned gates, the details of which are illustrated in FIG. 8. These gates conventionally comprise diodes 116 and 118 connected to a common output terminal 120 and via a resistor 122 to a terminal 124 to which is connected a source of positive voltage. Diodes 116 and 118 are respectively connected to terminals 126 and 128 which are respectively connected in turn to the character designation terminals 112 and timing terminals 114.

Each gate is represented in FIG. 7 as a circle having four quadrants and it is to be noted that these quadrants are selectively shaded in the drawing to identify the same and to illustrate the connection thereof to circuits which are to be hereinafter explained. It is to be noted that some of the circles which are identified generally by reference numeral 130 are further identified by means of arrows 132. The circles or gates 130, which are also identified by arrows 132, transmit signals to a blanking circuit, as will be hereinafter described.

It will be understood that a signal from select gate 100 will be selectively fed to one of terminals 112 according to the character to be displayed. The selection is performed by conventional circuitry (not shown). Stated otherwise, when it is time to display the next sequential character stored in register 98, the select gate will feed this character or its coded electrical representation via line 134 to one of terminals 112. This will operate to prime the vertical array of gates corresponding to that character for the transmission of a signal via each of the associated terminals 120 (FIG. 8).

Let it be assumed that select gate 100 transmits a signal corresponding to the character A. This signal will operate to prime all of the gates in the vertical array corresponding to the terminal 112 designated by the character A.

These gates, which are conventional, will transmit an output signal when input signals are received by both of the associated input terminals. In FIG. 8 this means that when input signals are received via terminals 126 and 128 an output signal will appear at terminal 120.

Thus, in FIG. 7 the vertical array of gates associated with character A will sequentially transmit output signals as second input signals are received via terminals 114. Consequently, these gates will sequentially transmit output signals since they receive their second input signals in sequence.

Careful inspection of the shading of the quadrants of circles 130 will illustrate that this shading has a particular relationship to the tables illustrated in FIGS. 4*a* and 4*b* and that, furthermore, units S1–S10 bear direct relationship with time periods $t_1$–$t_{10}$ of FIGS. 4*a* and 4*b*.

For example, considering character A, it will be noted that the uppermost circle 130 in the corresponding vertical array has its upper right hand quadrant shaded. This circle or gate, since it is connected to unit $S_1$ and to terminal 112(A), corresponds to time period $t_1$ for character A. The voltages indications which will be found in the tables of FIGS. 4*a* and 4*b* for these specific time periods show the deflection voltages which must be produced in response to a signal transmitted by this specific gate. The shading of the particular quadrant indicates, as will be seen hereinafter, the deflection circuits to which the gate transmits a signal to produce the required deflection voltages. Similarly, the circles or gates connected to units S2, S3 . . . S10 and to terminal 112(A) have their quadrants characteristically shaded to show, as will be seen, the deflection circuits to which signals are transmitted to provide the deflection voltages indicated in the tables of FIGS. 4*a* and 4*b*. The relationships of these gates to the deflection circuits will next be explained with reference to FIG. 9.

In FIG. 9 is illustrated the cathode ray tube 34. This cathode ray tube comprises a screen 136, a source 138 of a beam 140 which impinges on screen 136 to cause the emission of visible light, a blanking element 142 operatively disposed with respect to source 138, a set of horizontal deflection plates 144 and a set of vertical deflection plates 146.

In conventional manner, the beam 140 originating at source 138 can be cut off entirely by operation of blanking element 142. The beam can furthermore be controlled to move vertically and horizontally by plates 144 and 146.

Blanking element 144 is coupled via line 148 to blanking unit 16. Blanking unit 16 is, in turn, coupled via line 150 to gate 152.

Gate 152, which is exemplary also of gates 154, 156, 158 and 160 additionally comprised in the deflection circuit illustrated in FIG. 9, consists of a transistor 154 grounded at one end and coupled by a resistor 156 at the other end to a terminal 158 connected to a source of positive voltage; the transistor being biased by a biasing voltage supplied thereto via a terminal 160 and resistor 162.

Further, input terminals 164, 166 and 168 are coupled to transistor 154 via resistors 170, 172 and 174, respectively.

It should be noted that gate 152 is identified by a circle 130 having an arrow 132. This indicates that any gate identified by an arrow 132 in FIG. 7 transmits its output signal to gate 152 and thus to the blanking unit 16 to cause a cutting off of the beam 140 in tube 34.

For purposes of deflection of the beam 140, there are respectively coupled to amplifiers 30 and 32 capacitors 176 and 178. These capacitors serve to accumulate or discharge current selectively whereupon appropriately changing voltages are applied to said amplifiers. These voltages provide the variable slope ramps which have been heretofore mentioned and which ramps control the disposition of the line segments appearing on screen 136.

Operatively coupled, for example, to capacitor 178, is a transistor 180 which constitutes a source of current of magnitude I. Transistor 180 is connected via resistor 182 to a voltage supply terminal 184. Transistor 180 is also provided with an operating voltage via terminal 186.

The function of transistor 180 is to supply capacitor 178 with current at a predetermined rate and as long as there is no interference with this rate of supply, the voltage at capacitor 178 builds up at a constant rate or, in other words, provides a substantially linear slope such as illustrated, for example, in FIG. 4*a* in correspondence with character A and time period $t_1$.

For maintaining the voltage at capacitor 178 constant (as corresponding, for example, to character A in FIG. 4*a* during time period $t_3$), there is provided a voltage sink or drain 188 consisting of transistors 190 and 192 appropriately connected to bleed off a current of magnitude I.

For this purpose transistors 190 and 192 are coupled to appropriate voltage supplies by means of various resistors of readily determined value, the transistor 192 being coupled to gate 160 for selective control by matrix 106 (FIG. 7) when it is desired that sink 188 be rendered effective.

To provide a decreasing voltage slope at capacitor 178, a sink 194 is provided having associated therewith various resistors and operating voltages which permit the sink 194 to drain off current of a magnitude 2I. Thus, when sink 194 is rendered effective by means of gate 158 (in turn controlled by matrix 106) current is drained from capacitor 178 and the voltage thereat decreases at a rate of −I.

Similarly, capacitor 176 is provided with a current source 196 and sinks 198 and 200 which, respectively, drain the magnitude of current supplied by source 196 and twice this magnitude.

It is desirable that a condition of origin or reference be provided relative to the capacitors 176 and 178. For this purpose, there are further provided transistors 202 and 204. The input terminals for transistors 202 and 204 are illustrated respectively at 206 and 208. These input terminals are connected to output terminal 210, in FIG. 7, which is connected to unit S12 in recirculation loop 104. Thus, once each complete cycle provided by loop 104, a pulse is transmitted to terminals 206 and 208 (FIG. 9) and a predetermined initial or reference condition is established in each of capacitors 176 and 178.

Referring briefly to FIG. 7 again, it is to be noted finally that unit S11 is coupled to counter 102 which, in turn, is coupled to select gate 100. By the use of counter 102, it is possible to permit operation of select gate 100 once for a predetermined number of cycles established by loop 104. In other words, the select gate 100 may send a new character to matrix 106 every second or *n*th cycle rather than during each cycle in order to permit a retracing of the same character.

Reference will next be made to FIGS. 10*a* and 10*b* and to all of the circuits which have been heretofore described to indicate how a character approximation is actually formed on the screen 136 of cathode ray tube 34.

With initial reference to FIG. 10*a*, let it be assumed that the character A has been transmitted from data processor 96 to register 98 (FIG. 7) and has further been transmitted via select gate 100 to the terminal 112 corresponding to character A.

Under such circumstances all of the gates (as represented by circles 130) in the vertical array connected to this terminal 112 will be primed to transmit an output signal (via output terminal 120, FIG. 8). Triggering signals will be then transmitted to the gates of this vertical array in sequence from units S1–S10 of loop 104.

First the uppermost gate in this vertical array will transmit a signal. This signal will be transmitted to gate 156 (FIG. 9) which is identified by a circle 130 having corresponding shading. Gate 156 will in turn transmit a signal to sink 198 which, as noted above, drains the exact magnitude of current provided by current source 196. The voltage at capacitor 176 will thus remain constant and this corresponds to the indication given for the period $t_1$ and character A in the table of FIG. 4*b* (the horizontal table).

At the same time, no signals are transmitted via gates 154, 158 and 160. Sink 200 thus remains inactive and does not interfere with the activity of sink 198. On the other hand, in the vertical deflection circuit, sinks 188 and 194 are both inoperative so that the full supply of current from source 180 is fed to capacitor 178, the voltage of which linearly increases as illustrated for time period $t_1$ and character A in FIG. 4*a*.

With reference to FIG. 10*a*, and considering what has been explained above with regard to time period $t_1$ for character A, it is seen that the line traced during period $t_1$ moves from origin 212 vertically upwards from this origin. This results from the fact that the horizontal deflection voltage has been maintained constant while the vertical deflection voltage has been increased as a consequence of which the trace moves upward without any horizontal deflection whatsoever.

An examination of time period $t_2$ for character A, as illustrated in FIGS. 4*a* and 4*b*, reveals that the vertical deflection voltage is again increased while the horizontal deflection voltage is maintained constant. An examination of FIGS. 7 and 9 reveals that the operation is identical to that described above with the exception that unit S2 now acts upon the associated gate in the vertical array corresponding to character A.

Next, during time period $t_3$, the vertical deflection voltage remains constant, but the horizontal deflection voltage increases. This is indicated in FIG. 10*a* by line or line segment $t_3$.

Line segments $t_4$, $t_5$ and $t_6$ are similarly displayed on screen 136. However, time period $t_7$ requires a retracing of line segment $t_6$ and this requires a blanking operation which is indicated by an arrow 132 in correspondence with unit S7 in FIG. 7 and by the use of dotted lines in time period $t_7$ in FIGS. 4*a* and 4*b*. Thus the beam moves back to the beginning of line segment $t_6$, but does not retrace this line on the screen. The tracing, however, then continues during time periods $t_8$ and $t_9$ illustrated by the corresponding line segments in FIG. 10*a*.

FIG. 10*b* illustrates the procedure employed with respect to the character S which has been selected for purposes of illustrating how sloping line segments are traced. Considering, for example, line segment $t_2$, with reference to FIGS. 4*a* and 4*b*, it is seen that both the horizontal and vertical deflection voltages change during this time period. This causes the slope indicated at $t_2$ in FIG. 10*b*.

By appropriately relating the tables of FIGS. 4*a* and 4*b* with the matrix 106 in FIG. 7 and the connections of the gates in FIG. 7 with the circuits illustrated in FIG. 9, it is now possible to determine how the character approximations of FIGS. 2 or 3 are achieved.

The above circuitry is exemplary of the manner in which the invention contemplates the visual display of characters. There will, however, now be obvious to those skilled in the art many modifications and variations of the methods and circuits set forth above. These modifications and variations will not depart from the scope of the invention if defined by the following claims.

What is claimed is:

1. Apparatus for representing information as a series of characters, each character being formed of a sequence of visible traces, comprising:

means representing the information as a series of character signals;

a read-only matrix coupled to said representing means and comprising a plurality of groups of gating elements, each group responsive to a particular character signal to be primed thereby;

means for sequentially energizing each of the gating elements in a primed group;

horizontal and vertical function generators, each comprising means for generating a linearly increasing function and a pair of means for modifying said function to decreasing and constant magnitude voltage functions;

means selectively coupling said function modifying means in each of said horizontal and vertical function generators to said gating elements for selecting the vertical and horizontal linear functions to be sequentially paired; and means coupled to said function generators for converting the sequential paired voltage functions to sequential traces synthesizing the character.

2. The apparatus claimed in claim 1 further comprising blanking means selectively coupled to said gating elements and connected to said converting means for inhibiting the visibility of a trace.

3. The apparatus claimed in claim 2 in which the means for generating a linearly increasing function in each said function generators comprises a constant current source and means coupled to said source for deriving a linearly increasing voltage therefrom; and in which each said modifying means comprises means coupled to at least one of said source and said voltage deriving means for bleeding a predetermined amount of current therefrom.

4. The apparatus claimed in claim 3 in which said voltage deriving means comprises a capacitor and in which the pair of bleeding means comprises a pair of transistor circuits for bleeding said constant current and twice said constant current, respectively.

5. The apparatus claimed in claim 2 further comprising means for positioning the starting point of each character trace.

6. The apparatus claimed in claim 2 in which said sequential energizing means comprises delay elements connected in a serial loop.

7. Apparatus for representing information as a series of characters, each character being formed of a sequence of visible traces, comprising:

means representing the information as a series of character signals;

a read-only matrix coupled to said representing means and comprising a plurality of groups of gating elements, each group responsive to a particular character signal to be primed thereby;

means for sequentially energizing each of the gating elements in a primed group;

horizontal and vertical function generators each normally generating a linearly increasing voltage function and each comprising means for modifying said voltage function to a linearly decreasing voltage function and to a voltage function of constant magnitude;

a plurality of "or" gates selectively coupling each said modifying means to said gating elements for selecting the vertical and horizontal linear functions to be sequentially paired; and means coupled to said function gentrators for converting the sequential paired voltage functions to sequential traces synthesizing the character.

8. The apparatus claimed in claim 7 further comprising blanking means selectively coupled to said gating elements and connected to said converting means for inhibiting the visibility of a trace.

9. The apparatus claimed in claim 8 in which the generators normally generating a linearly increasing voltage function comprises a constant current source and a capacitor coupled thereto, and in which the means for modifying said voltage function comprises means coupled to said source and said capacitor for bleeding a predetermined amount of current from each.

References Cited by the Examiner

UNITED STATES PATENTS

| | | | |
|---|---|---|---|
| 2,594,731 | 4/1952 | Connolly | 340—324.1 |
| 2,875,951 | 3/1959 | Schreiner | 340—324.1 |
| 2,920,312 | 1/1960 | Gordon et al. | 340—324.1 |
| 2,931,022 | 3/1960 | Triest | 340—324.1 |
| 3,020,530 | 2/1962 | Volberg | 340—324.1 |
| 3,047,851 | 7/1962 | Palmiter | 340—324.1 |
| 3,090,041 | 5/1963 | Dell | 340—324.1 |
| 3,104,387 | 9/1963 | Loshin | 340—324.1 |
| 3,161,866 | 12/1964 | Orenstein et al. | 340—324.1 |

NEIL C. READ, *Primary Examiner.*

IRVING L. SRAGOW, *Examiner.*

H. I. PITTS, *Assistant Examiner.*